Sept. 10, 1968     P. FRENCH ET AL     3,401,285
VARIABLE RELUCTANCE DYNAMOELECTRIC MACHINES
Filed April 25, 1966
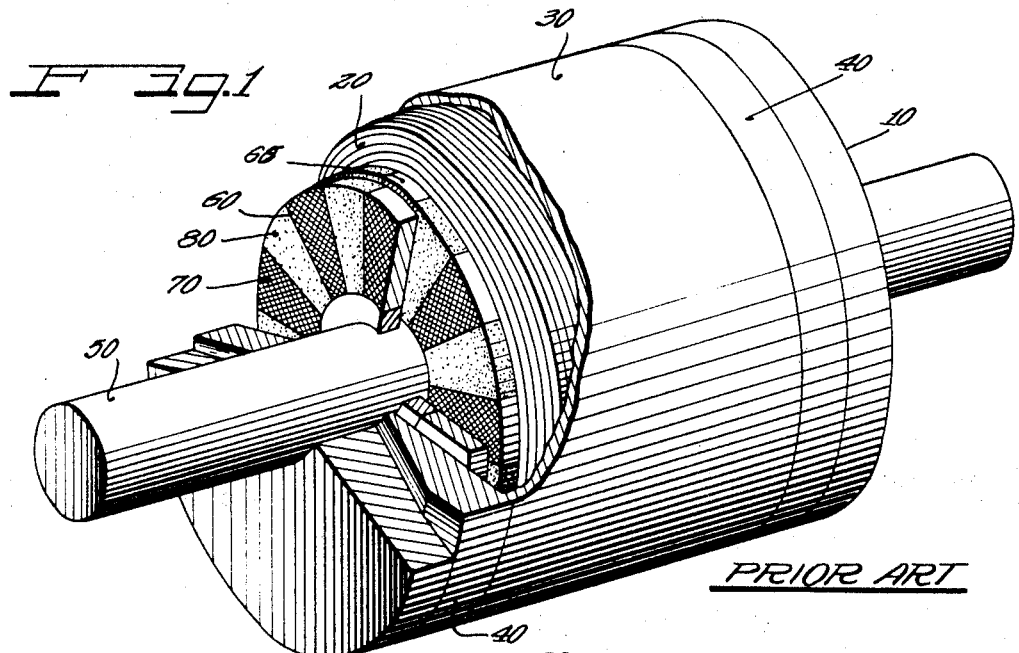
Fig. 1 — PRIOR ART
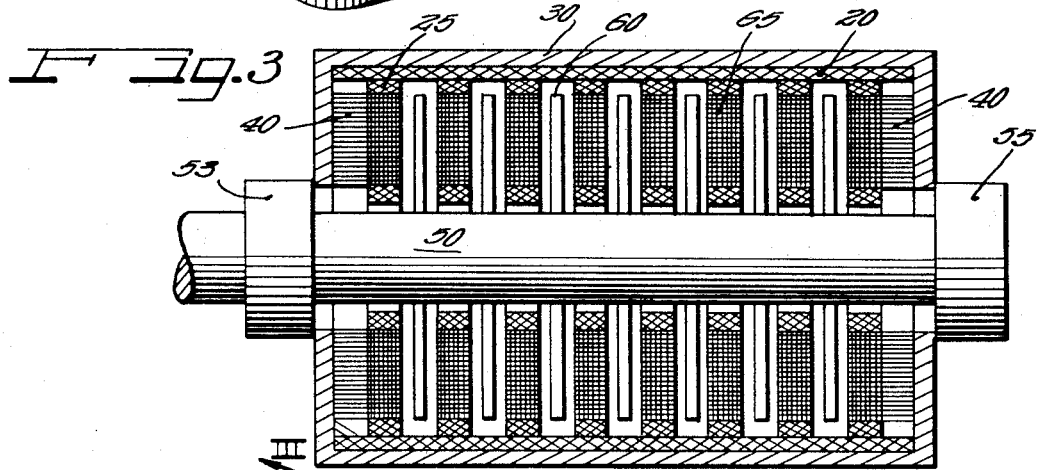
Fig. 3
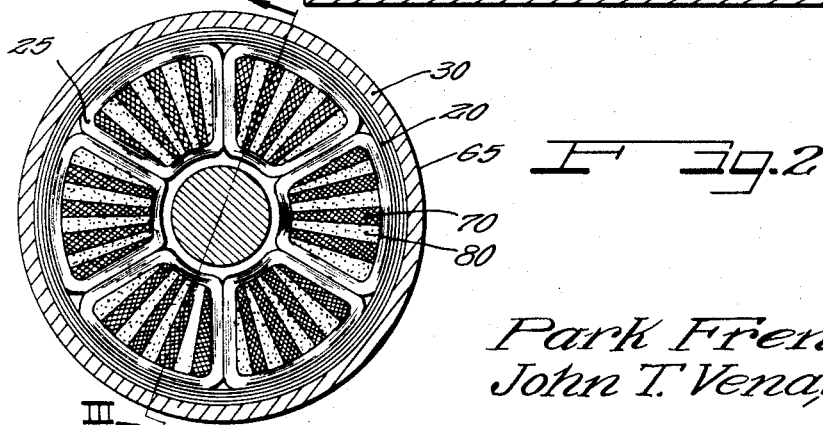
Fig. 2
INVENTORS
Park French
John T. Venaleck
BY *Hill, Sherman, Meroni, Gross & Simpson*    ATTORNEYS United States Patent Office 3,401,285
Patented Sept. 10, 1968

3,401,285
VARIABLE RELUCTANCE DYNAMOELECTRIC
MACHINES
Park French, Aurora, and John T. Venaleck, Mentor,
Ohio, assignors to TRW Inc., Cleveland, Ohio, a corporation of Ohio
Filed Apr. 25, 1966, Ser. No. 544,781
5 Claims. (Cl. 310—168)

The present invention relates to new types of dynamoelectric machines, and more particularly to a dynamoelectric reluctance machine having disk-type rotors and stators.

The machines of the present invention are of the disk rotor and stator type in which a shaft carries one or more spaced rotor elements which are interleaved or in interdigitated relationship with a plurality of stator disks. While this type of machine per se, is known, the present invention provides a new and unique manner of controlling the operation of the machine. Also, the construction in accordance with the principles of the invention makes it possible to obtain good power-to-weight ratios at high efficiencies and relatively low shaft speeds, which develop smooth and uniform torque.

One of the objects of the present invention is to provide an improved dynamoelectric machine which develops a very smooth and uniform torque.

Another object of the invention is to provide an improved dynamoelectric machine which for some applications is capable of using low permeability magnetic materials and still provide high efficiency.

Another object of the invention is to provide an improved rotor-stator configuration for a variable reluctance multiphase generator.

Still another object of the invention is to provide an improved dynamoelectric machine of the class described which can be operated by means of three or more phase power.

In accordance with the present invention, we provide a dynamoelectric machine which includes a frame, a shaft supported for rotation within the frame, a plurality of rotor elements secured in closely spaced relation along the shaft, a plurality of stator elements extending from the frame in interleaved relation with the rotor elements, the rotor elements and stator elements each consisting of disks having alternating areas composed of magnetic and non-magnetic materials, in combination with one or more coils wound about the combination of rotor and stator elements, and also a plurality of coils mounted on certain of the elements to provide an appropriate axial magnetic field for developing a smooth torque for the machine. Each of these mounted coils surrounds a given number of magnetic and non-magnetic sectors for the purpose of enabling a number of alternating current phases to act on each disk element. As a result, these mounted coils can be provided with three or more phases of current.

Through the arrangement of the rotor and stator disks, the machines of the present invention have magnetic paths which vary periodically in reluctance with the angular position of their rotors. The magnetic flux paths link the coils mounted on the elements which provide the necessary magnetomotive forces in the magnetic circuits. By applying pulsed or periodically varying currents to the mounted coils in synchronism with the reluctance variations, the devices become dynamoelectric machines. If the periods of high current coincide with the periods of decreasing reluctance, the machines act as motors. Conversely, if the high current periods occur during periods of increasing reluctance, the devices act as generators.

A further description of the present invention will be made in conjunction with the attached drawing which illustrates the principles of the present invention.

In the drawing:

FIGURE 1 is a view in perspective of a dynamoelectric reluctance machine as known in the prior art with a portion thereof removed;

FIGURE 2 is a front elevational view of a disk element of the disk element dynamoelectric reluctance machine in accordance with the principles of the present invention; and FIGURE 3 is an elevational view partly in cross-section taken along line III—III as shown in FIGURE 2 of the disk element dynamoelectric reluctance machine.

In FIGURE 1, a dynamoelectric reluctance machine 10 as known in the prior art is shown with a portion thereof removed. This figure shows the placing of the major components of the machine, including a centrally disposed shaft 50 which carries an alternating series of rotor disks 60 positioned between axially spaced stator disks 65. A cylindrical flux return section 30 is coaxial with the shaft 50 and forms an outer casing for the dynamoelectric machine. The flux return paths at the ends of the casing are provided by spaced end plates 40 secured to the casing. An axial magnetic field is provided by an excitation coil 20 in circumferential relation to the stator disks 65.

The outside flux return section 30 is composed of a ferromagnetic material having a reasonably high permeability, on the order of at least 50. Both the rotor disks and the stator disks may be identical in magnetic geometry, and consist of alternating equal width sectors 70 of ferromagnetic material, and sectors 80 of non-magnetic material as exemplified in FIGURE 2.

The magnetic sectors are aligned axially with corresponding sectors of all the disks in the rotor set and likewise in the stator set. When the rotor is turned, its magnetic sectors alternately align themselves with the magnetic and non-magnetic portions of the stator. The variation in reluctance to an axial magnetic field created by coil 20 can be made very large by this action.

The operation of the machine can be understood in terms of forces by the tendency of the magnetic sectors 70 of the rotor to align themselves with those of the stator when an axial magnetic field is applied. If the field is applied during the closing phase of the magnetic circuit, the rotor is pulled into alignment with the stator, after which the magnetic circuit is allowed to coast to the open position under low or zero field conditions. This action delivers a rotational force to the rotor, providing motor action. Similarly, applying the field during the opening phase requires a torque input through the rotor shaft, providing generator action.

The coil 20 provides the necessary axial magnetic field. Thus when current passes through the coil 20 from a suitable source of alternating current (not shown in these drawings), an axial magnetic field is provided, the field encountering a variable reluctance, depending upon the relative position between the rotor disks and the stator disks. The flux return path of the machine extends through the end flux return section 40 and thence through the frame or outside flux return section 30.

Referring now to FIGURE 2, an improved stator section 65 is illustrated with the addition of coils 25. The shape and positions of the alternating current coils 25 are shown for three- or six-phase operation, in view of the fact that six coils 25 are present. The coils 25 are integral parts of the stator disks, which are normally thicker than the rotor disks in optimized designs. The rotor disks are similarly constructed, in the preferred form of the invention, without the use of the alternating current coils mounted thereon.

In accordance with the present invention, each coil 25 contains a number of magnetic sectors, so that the power efficiency resulting from the excitation of a number of poles with the same coil is not lost. The magnetic sectors, indicated in cross-section at reference numeral 70 of FIGURE 3, are positioned azimuthally in each coil 25 to achieve proper alignment with the rotor sections at the time appropriate with respect to the current phase of each coil 25.

If three or more phase power is used, the net axial alternating current flux through the active sections is zero or very small. Under these circumstances, the outside flux return path 30 can be arranged to carry direct current flux only and can be constructed of solid rather than laminated magnetic material. In many cases, this type of return path can also serve as the machine frame. The alternating current flux return paths through the end-rings 40, as shown in FIGURE 3, are simple laminated end-rings which properly distribute the alternating current flux from each coil 25 among the regions enclosed by the various alternating current coils. As shown in the drawing, the end-rings 40 also carry the direct current flux to the direct current return path 30.

Referring now to FIGURE 3, in accordance with the principles of the present invention, a dynamoelectric machine is illustrated having the same arrangement as the machine shown in FIGURE 1 but with the improved stator construction. This machine, as shown in cross-section, has a shaft 50 mounted for rotation, and a plurality of rotor disks 60 fixedly mounted thereon. The stator disks 65 are interleaved with the rotor disks 60 to interact therewith. The shaft 50 is mounted for rotation between bearings 53 and 55. The main winding 20 is wrapped about the rotor and stator assembly, thereby providing a static magnetic field as a result of the direct current flowing within coil 20. The resulting static magnetic field is aligned in an axial direction to interact with the rotor and stator disks. The flux return section 30 and the flux return section 40 (which are laminated end-rings) are located at the outside of the structure of the machine to provide a return path for the magnetic field of the main coil 20 and the mounted coils 25.

The electrical circuit portion of the machine is separated into the main coil 20 and the mounted coils 25, one for the direct current excitation and the other for alternating current power input or output, respectively. The electric power source for this machine is not shown in the drawing; however, the driving sources including the necessary auxiliary circuits for providing proper current phase relationships are known, such as those disclosed in the application entitled, "Variable Reluctance Dynamoelectric Machines," Ser. No. 651,780, a continuation of application No. 384,733, now abandoned, or the application entitled "Disk Element Dynamoelectric Machines," by Park French and William J. Skinner, Ser. No. 283,171.

This type of machine can conveniently operate in conjunction with alternating current power lines. Three or more phase operation can easily be accomplished. Also, the shaft 50 is composed preferably of a non-magnetic material, which provides the machines with desirable characteristics such as a high horsepower-to-weight ratio.

As an additional modification of the machine shown in FIGURE 1, the direct current flux return path 30 can be replaced by a return path made of permanent magnetic material. This modification eliminates the need for the direct current excitation coil 20, and can be used to advantage in some cases where efficiency is a prime consideration.

It will be noted that the machines described herein fulfill all the requirements previously noted. The use of the alternating current coils mounted on the disk elements provide smoother torque as a result of an evenly distributed dynamic magnetic field, and furthermore enables the use of three or more phase operation of the machine, and the other principles described herein meet the objectives of the present invention.

It should be evident that various modifications can be made to the described embodiment without departing from the scope of the present invention.

We claim as our invention:
1. A dynamoelectric reluctance machine comprising:
a frame;
a shaft rotatably mounted on the frame;
at least one rotor element secured in closely spaced relation along said shaft;
a plurality of stator elements extending from said frame in interleaved relation with said rotor elements,
a plurality of coil means disposed in each of said stator elements, each of said coil means having a plurality of magnetic and non-magnetic sectors contained therein, and
field means for providing a static magnetic field extending in a parallel direction with respect to said shaft to excite said machine for control thereof.
2. The machine of claim 1 which also includes a pair of ferromagnetic end plates at opposite ends of the rotor-stator elements providing a flux return path for said elements.
3. The machine of claim 1 in which each of said coil means confines at least three magnetic and three non-magnetic sectors therein.
4. The dynamoelectric machine of claim 1 in which said frame is composed of a permanent magnet material.
5. In a dynamoelectric reluctance machine having a plurality of rotor and stator elements mounted in interleaved relation along a shaft and having winding means for providing a static magnetic field, the stator elements each comprising:
a disk having a plurality of magnetic sectors alternating with a plurality of non-magnetic sectors, and
a plurality of windings about said disk, each winding confining therein a plurality of said magnetic and non-magnetic sectors.

References Cited
UNITED STATES PATENTS

| 579,012 | 3/1897 | Scheeffer | 310—168 |
| 2,438,629 | 3/1948 | Anderson | 310—268 |
| 3,284,651 | 11/1966 | Wesolowski | 310—168 |

MILTON O. HIRSHFIELD, *Primary Examiner.*

L. L. SMITH, *Assistant Examiner.*